United States Patent
Davidian et al.

(10) Patent No.: US 9,862,632 B2
(45) Date of Patent: Jan. 9, 2018

(54) ENERGY RECOVERY FROM FUMES FROM A MELTING FURNACE USING A GAS TURBINE AND HEAT EXCHANGERS

(71) Applicant: L'Air Liquide, Societe Anonyme pour l'Etude et l'Exploitation des Procedes Georges Claude, Paris (FR)

(72) Inventors: Benoit Davidian, Saint Maur des Fosses (FR); Youssef Joumani, Crespieres (FR); Jocelyn Le Dirach, Versailles (FR); Jean-Pierre Tranier, L'Hay-les-Roses (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 225 days.

(21) Appl. No.: 14/654,311

(22) PCT Filed: Dec. 5, 2013

(86) PCT No.: PCT/FR2013/052958
§ 371 (c)(1),
(2) Date: Jun. 19, 2015

(87) PCT Pub. No.: WO2014/096613
PCT Pub. Date: Jun. 26, 2014

(65) Prior Publication Data
US 2015/0353406 A1     Dec. 10, 2015

(30) Foreign Application Priority Data
Dec. 20, 2012 (FR) .................................... 12 62376

(51) Int. Cl.
*F02C 7/08* (2006.01)
*F02C 7/10* (2006.01)
(Continued)

(52) U.S. Cl.
CPC ............ *C03B 5/2353* (2013.01); *C03B 5/235* (2013.01); *C03B 5/237* (2013.01); *F02C 1/05* (2013.01);
(Continued)

(58) Field of Classification Search
CPC . F23J 15/006; F02C 7/143; F02C 7/08; F02C 7/10; F02C 7/224; F02C 1/00; Y02E 20/314; Y02E 20/348
(Continued)

(56) References Cited

U.S. PATENT DOCUMENTS 2,401,285 A * 5/1946 Woodward ................ F02C 1/05
                                                  122/DIG. 1
4,030,877 A   6/1977 Robinson
(Continued)

FOREIGN PATENT DOCUMENTS

EP   0 872 690 A2   10/1998
EP   1 338 848 A2   8/2003

OTHER PUBLICATIONS

International Search Report and Written Opinion for PCT/FR2013/052958, dated Feb. 24, 2014.

*Primary Examiner* — Gregory A Wilson
(74) *Attorney, Agent, or Firm* — Christopher J. Cronin

(57) ABSTRACT

The invention relates to a unit and method for melting in a furnace comprising a combustion-heated melting chamber, in which the air is heated by means of heat exchange with the fumes generated by combustion. The heated air is used in a gas turbine in order to generate electrical and/or mechanical energy. In addition, the effluent from the gas turbine is used to pre-heat the combustion oxygen and/or gaseous fuel upstream of the melting chamber.

15 Claims, 2 Drawing Sheets

(51) Int. Cl.
*C03B 5/235* (2006.01)
*F23L 15/02* (2006.01)
*F23L 7/00* (2006.01)
*F02C 1/05* (2006.01)
*C03B 5/237* (2006.01)
*F23L 15/04* (2006.01)
*F23R 3/00* (2006.01)
*F27D 17/00* (2006.01)
*F25J 3/04* (2006.01)

(52) U.S. Cl.
CPC ............... *F23L 7/007* (2013.01); *F23L 15/02* (2013.01); *F23L 15/045* (2013.01); *F23R 3/005* (2013.01); *F25J 3/04018* (2013.01); *F25J 3/04133* (2013.01); *F25J 3/04533* (2013.01); *F25J 3/04593* (2013.01); *F25J 3/04612* (2013.01); *F27D 17/004* (2013.01); *F23K 2900/01041* (2013.01); *F23L 2900/07005* (2013.01); *F23L 2900/15042* (2013.01); *F23L 2900/15043* (2013.01); *F25J 2240/82* (2013.01); *Y02E 20/344* (2013.01); *Y02E 20/348* (2013.01); *Y02P 10/143* (2015.11); *Y02P 40/535* (2015.11); *Y02P 40/55* (2015.11)

(58) Field of Classification Search
USPC .......................... 122/7 R; 60/650, 682, 736
See application file for complete search history.

(56) References Cited

U.S. PATENT DOCUMENTS

| | | | |
|---|---|---|---|
| 4,528,012 A | | 7/1985 | Sturgill |
| 5,006,141 A | * | 4/1991 | Chen .................... C03B 5/2353 65/134.6 |
| 5,326,081 A | * | 7/1994 | Arpalahti ............. F27D 17/004 266/155 |
| 2003/0010061 A1 | * | 1/2003 | Ha ..................... C01B 13/0248 65/32.5 |
| 2012/0135362 A1 | * | 5/2012 | Bioul .................. C01B 13/0255 432/180 |

* cited by examiner

US 9,862,632 B2

ENERGY RECOVERY FROM FUMES FROM A MELTING FURNACE USING A GAS TURBINE AND HEAT EXCHANGERS

CROSS-REFERENCE TO RELATED APPLICATIONS

This application is a §371 of International PCT Application PCT/FR2013/052958, filed Dec. 5, 2013, which claims §119(a) foreign priority to French patent application 1262376, filed Dec. 20, 2012.

BACKGROUND

Field of the Invention

In a melting furnace, the raw materials are converted into molten material by an application of heat energy which is generally supplied at least in part by combustion.

Most of the heat energy generated by the flames is transferred to the charge (solid raw materials and molten material). However, residual energy is removed from the furnace with the combustion fumes.

In the case of an aerocombustion, or air-fuelled combustion melting furnace, it is thus known practice to use alternating countercurrent exchangers made up of ceramics (regenerators) or steel exchangers (recuperators) for preheating the combustion air upstream of the furnace so as to increase not only the efficiency of the combustion in the furnace but also the efficiency of the installation overall insofar as some of the heat energy contained in the removed fumes is recuperated and used as energy for preheating the combustion air.

In a glass furnace with recuperators, the combustion air is preheated to 700° C. whereas regenerators allow combustion air temperatures of 1200° C. or even 1250° C. to be achieved at the start of life of the installation.

The operators of melting furnaces, particularly glassmakers, are increasingly adopting oxycombustion technology, which is both more effective (because it eliminates the thermal ballast of the nitrogen) and less polluting (reducing the NOx and $CO_2$ as it is this same nitrogen that is the origin from which the NOx is formed).

However, the systems for recuperating energy from fumes that have been developed for aerocombustion (regenerators and recuperators) are not generally well suited to the recuperation of heat energy from the fumes generated by oxycombustion.

Related Art

EP-A-1338848 describes a system for recuperating energy from the fumes of a glass furnace, particularly an oxycombustion glass furnace. Said system comprises at least one heat exchanger for preheating an oxygen-rich gas and/or a gaseous fuel by exchange of heat with the fumes removed from the furnace, a boiler situated downstream of the at least one heat exchanger and able to generate superheated steam by exchange of heat with the fumes and a steam turbine for expanding the superheated steam to produce mechanical energy.

According to EP-A-1338848, the mechanical energy generated by the turbine can be used to fulfill at least some of the energy requirements of an installation for separating the gases of the air which supplies combustion oxygen for the glass furnace.

In order to produce superheated steam in the boiler at an industrially acceptable efficiency, the fumes at the inlet to the boiler, and therefore also at the outlet of the heat exchanger, need to be at a temperature of at least 1000° C., or even of 1200° C. to 1500° C.

Despite the good ability of the materials identified in EP-A-1338848 to withstand such temperatures, glassmakers prefer to use lower-temperature energy recuperation systems which are considered to be more durable.

Such an alternative system that is particularly reliable at recuperating energy from the fumes of an oxycombustion glass furnace is described in EP-A-0872690.

According to EP-A-0872690, the fumes originating from the oxycombustion furnace are used for the indirect preheating of the oxygen and/or of the fuel upstream of the furnace. In a first heat exchanger, the fumes from the furnace heat an intermediate fluid, such as air for example, by exchange of heat between the two fluids. The heated intermediate fluid from the first exchanger is used in a second heat exchanger to heat combustion oxygen and/or the fuel.

The system for recuperating energy from fumes according to EP-A-0872690 does not, however, allow additional recuperation of energy from the fumes in the form of superheated steam, as is the case in EP-A-1338848, because in practice the fumes at the outlet of the first exchanger are at a temperature markedly below 1000° C.

SUMMARY OF THE INVENTION

It is an objective of the present invention to increase the efficiency with which heat is recuperated from the fumes of a melting furnace using a gaseous fuel and/or oxygen as oxidant and in which the combustion oxygen and/or gaseous fuel are preheated by indirect exchange of heat with the fumes removed from the furnace.

The present invention relates more particularly to a method for melting in a furnace comprising a melting chamber. According to this method, combustion oxygen and/or gaseous fuel is preheated in a heat exchanger referred to as primary exchanger upstream of the melting chamber by exchange of heat with a heat-transfer gas.

The combustion oxygen and/or the preheated gaseous fuel is used to heat the melting chamber by means of combustion, thereby generating heat energy and fumes in the melting chamber.

The fumes are removed from the melting chamber and introduced into a heat exchanger, referred to as secondary heat exchanger, to heat compressed air by exchange of heat with the fumes removed from the melting chamber.

According to the invention, the heated compressed air coming from the secondary exchanger is used as oxidant in a gas turbine. This gas turbine thus generates mechanical and/or electrical energy and a gaseous effluent. Said gaseous effluent from the gas turbine is used as heat-transfer gas for preheating combustion oxygen and/or gaseous fuel in the primary exchanger.

At least combustion oxygen and, preferably, also gaseous fuel is or are advantageously preheated in the primary exchanger. Specifically, because, according to the invention, the combustion reagent is heated by indirect exchange of heat with the fumes, which means to say exchange via a heat-transfer fluid, the present invention is particularly suited to and reliable for preheating oxygen.

According to the invention, significant synergy between, on the one hand, the system for recuperating heat energy from the fumes coming from the melting chamber and, on the other hand, the gas turbine is observed. Specifically, an energy efficiency is observed that is markedly higher than the energy efficiency that could be expected from simple combination of a gas turbine with the combustion oxygen and/or the gaseous fuel preheated using the fumes.

It should be noted that combustion is not necessarily the only means of heating the melting chamber, which may comprise other heating means such as electrodes.

The preheated combustion oxygen may be the only oxidant used for combustion in the melting chamber or may be used in combination with another oxidant, typically air.

The furnace may thus be an oxycombustion furnace (in which oxygen is the only oxidant), an enriched combustion furnace (with oxygen-enriched air by way of oxidant) or alternatively a hybrid oxidant furnace (using a combination of, on the one hand, combustion using oxygen and, on the other hand, combustion using air, possibly oxygen-enriched air).

In this context, the term "oxygen" refers to a gas that has an $O_2$ content of at least 75 vol %, preferably between 80 vol % and 100 vol %, and, more preferably, between 90 vol % and 100 vol %.

Similarly, the preheated gaseous fuel may be the only fuel used for the combustion in the melting chamber or the preheated gaseous fuel may be used in combination with another fuel.

The mechanical and/or electrical energy generated by the gas turbine may be supplied at least in part to one or more air compressors. The air compressor or compressors are notably chosen from: an air compressor which feeds the secondary heat exchanger, an air compressor which feeds a unit for separating the gases of the air and another air compressor. Specifically, not only is the melting installation equipped with an air compressor, often referred to as blower, for supplying compressed air to the secondary exchanger, but the installation may also additionally comprise a unit for separating the gases of the air and/or other units that consume compressed air. The installation may notably comprise a unit that separates the gases of the air which supplies the combustion oxygen, compressed air cooling installations, etc.

According to one embodiment of the method according to the invention, the gas turbine supplies between 75% and 100%, preferably 100%, of the energy consumption of the air compressor which feeds the secondary heat exchanger with compressed air.

For preference, the gas turbine supplies between 25% and 100%, preferably between 50% and 100%, and, in particular, 100%, of the energy consumption of the air compressor which feeds the unit for separating the gases of the air. This unit for separating the gases of the air preferably generates combustion oxygen for the melting method. The unit for separating the gases of the air may notably comprise a distillation column for the cryogenic distillation of the gases of the air, although other types of unit for separating the gases of the air are also conceivable. The unit for separating the gases of the air may notably be a system based on the technique referred to as VSA (Vacuum Swing Absorption).

It is also beneficial to provide a liquid oxygen reservoir as a source of combustion oxygen when the production of combustion oxygen by the unit for separating the gases of the air is shut down or producing less. When the separation unit is powered by the gas turbine, such a shutdown or reduction in output of the separation unit may notably occur when the gas turbine is taken out of service for maintenance. Such an oxygen reservoir has a storage volume that allows combustion oxygen to be fed to a capacity of the melting chamber for 6 to 8 hours when the unit for separating the gases of the air is shut down. It is also beneficial to provide an auxiliary power source such as an electricity generator set for supplying mechanical energy and/or electrical energy that can be used when the gas turbine is shut down.

The parameters of the method according to the invention are dependent on the material that is to be melted, such as glass, metal, enamel, etc., on size and type of melting chamber, on the throughput of molten material, etc.

The following operating parameters have been identified as advantageous, alone or in combination, notably, although not solely, when the method is a method of melting glass:
the temperature of the fumes at the inlet to the secondary exchanger is from 1000° C. to 2000° C.,
the compressed air is at a pressure from 10 to 20 atm at the inlet of the secondary exchanger,
the temperature of the heated compressed air at the outlet of the secondary exchanger is from 600° C. to 800° C.,
the temperature of the gaseous effluent at the outlet of the gas turbine is from 600° C. to 800° C.

Some of the preheated gaseous fuel coming from the primary exchanger may beneficially be used as fuel for the gas turbine.

The present invention also relates to a melting installation suited to implementing any one of the embodiments of the method according to the invention.

Thus, the invention relates to a melting installation which comprises a furnace defining a melting chamber heated by combustion. The melting chamber also comprises at least one outlet for fumes for evacuating the fumes generated by this combustion.

The installation also comprises a primary heat exchanger for preheating, by exchange of heat with a heat-transfer fluid, combustion oxygen and/or gaseous fuel upstream of the melting chamber. Said primary exchanger exhibits (a) a (hot) heat-transfer fluid inlet and a (temperate) heat-transfer fluid outlet and (b) a combustion oxygen inlet (for the combustion oxygen that is to be preheated) and a combustion oxygen outlet (for the preheated combustion oxygen) and/or a gaseous fuel inlet (for gaseous fuel that is to be preheated) and a gaseous fuel outlet (for the preheated gaseous fuel).

The primary exchanger beneficially exhibits an inlet and an outlet for combustion oxygen and preferably also an inlet and an outlet for gaseous fuel.

The melting installation also comprises a secondary heat exchanger for heating compressed air by exchange of heat with the fumes coming from the melting chamber. Said secondary exchanger exhibits (a) a compressed air inlet (for the compressed air that is to be heated) and a compressed air outlet (for the heated compressed air) and (b) a (hot) fumes inlet and a (temperate) fumes outlet.

The melting installation is equipped with a first air compressor connected to the compressed air inlet of the secondary exchanger so as to allow the first compressor to supply compressed air to the secondary exchanger.

As a general rule, in the present context, the term "connected" is used in the sense of "fluidically connected", for example using a pipe.

The fumes inlet of the primary exchanger is connected to at least one fumes outlet of the melting chamber. The combustion oxygen outlet of the primary exchanger is connected to at least one oxidant injector of the melting chamber and/or the gaseous fuel outlet of the primary exchanger is connected to at least one fuel injector of the melting chamber.

According to the invention, the installation also comprises a gas turbine with an air intake nozzle and an exhaust. The compressed air outlet of the secondary exchanger is connected to the air intake nozzle of the gas turbine. The exhaust of the gas turbine is connected to the heat-transfer fluid inlet of the primary exchanger so as to allow the primary exchanger to be supplied with exhaust gas from the gas turbine by way of heat-transfer fluid.

According to one preferred embodiment of the installation, the gas turbine supplies mechanical and/or electrical energy to at least one air compressor. The gas turbine may notably supply mechanical and/or electrical energy to at least one air compressor chosen from: the first air compressor, an air compressor which feeds a unit for separating the gases of the air and another air compressor, such as an air compressor referred to as "second compressor" which supplies compressed air to at least one other unit of the compressed air consuming installation.

When the gas turbine supplies mechanical energy to at least one air compressor, this is advantageously performed by means of a transmission shaft connecting the gas turbine to said air compressor.

When the installation according to the invention comprises a unit for separating the gases of the air, this preferably comprises an oxygen outlet connected to the melting chamber so that the gas separation unit can supply combustion oxygen to said chamber. For this supply of combustion oxygen, the oxygen outlet of the unit for separating the gases of the air is preferably connected to the combustion oxygen inlet of the primary exchanger. The oxygen outlet of the unit for separating the gases of the air is then connected to the melting chamber via the primary exchanger, the combustion oxygen outlet of which is connected to said melting chamber.

In this way, this oxygen outlet of the separation unit can be connected to one or more oxidant injectors with which the melting chamber is equipped either directly or, for preference, via the primary exchanger.

As indicated hereinabove, the unit for separating the gases of the air preferably comprises a cryogenic distillation column for the cryogenic distillation of the gases of the air, but may also be an installation of the VSA type.

The installation advantageously also comprises an oxygen reservoir by way of source of combustion oxygen when the unit for separating the gases of the air is shut down or producing less. The installation may also beneficially comprise an auxiliary source of mechanical energy and/or of electrical energy, such as an electricity generator set, for supplying mechanical energy and/or energy when the gas turbine is shut down.

As indicated earlier, combustion may be the only means of heating the melting chamber or may be combined with other heating systems such as electrodes.

The (hot) combustion oxygen may be the only oxidant or may be combined with other oxidants, such as air in particular. The gaseous fuel may be the only fuel or may be combined with other fuels.

An oxidant injector connected to the combustion oxygen outlet of the primary exchanger may form part of a burner of the melting chamber. Such an oxygen injector may also form part of an oxidant lance of the melting chamber and in particular of an oxygen lance.

Similarly, a gaseous fuel injector connected to the gaseous fuel outlet of the primary exchanger may form part of a burner of the melting chamber or may be incorporated into a fuel lance of said chamber.

According to one preferred embodiment, the melting furnace is a glass furnace and in particular a glass furnace for glass of the float glass type (namely comprising a float bath also referred to as a metal bath), but the invention is also of use for other types of melting furnace, including furnaces for melting metals such as, for example, non-ferrous metals.

The use of a melting installation according to any one of the embodiments described hereinabove in a method according to the invention is also covered.

The present invention and advantages thereof are described in further detail hereinafter with reference to FIGS. 1 and 2.

BRIEF DESCRIPTION OF THE FIGURES

For a further understanding of the nature and objects for the present invention, reference should be made to the detailed description, taken in conjunction with the accompanying drawing, in which like elements are given the same or analogous reference numbers and wherein.

DETAILED DESCRIPTION OF THE INVENTION

Figure 1:
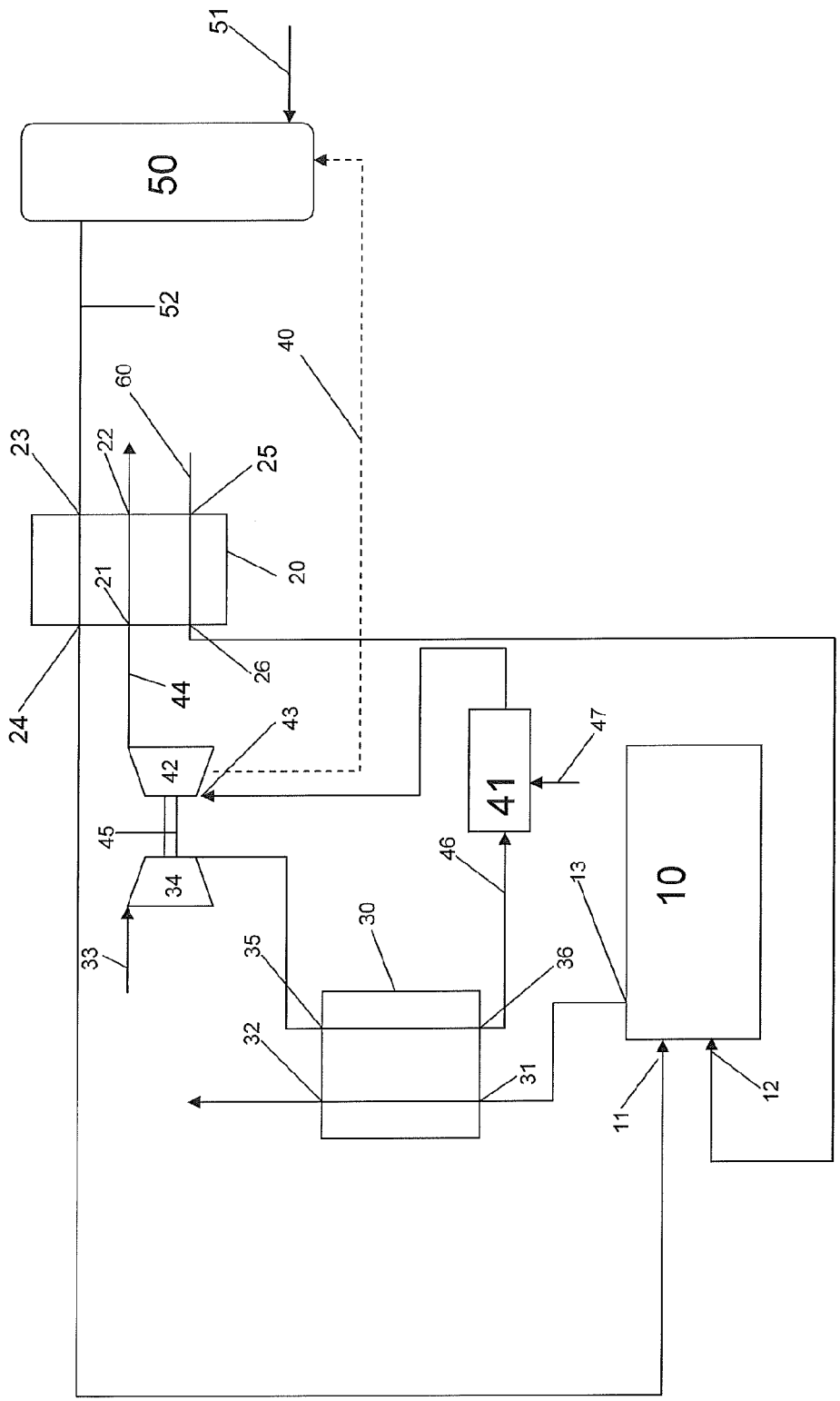
FIGS. 1 and 2 are schematic depictions of two examples of an installation and of a method according to the invention.

The melting furnace 10 is an oxycombustion furnace, heated by a number of oxyburners (not depicted). Said burners are fed with fuel, such as natural gas for example, by the pipe 12 and with combustion oxygen by the pipe 11.

The combustion oxygen is generated by a unit for separating the gases of the air 50 which separates compressed air 51 into a stream of oxygen 52 having an $O_2$ content of at least 90 vol %, and a stream (not depicted) consisting chiefly of $N_2$.

The fumes generated by the oxycombustion in the furnace 10 are removed from the melting chamber by the outlet 13, said fumes being at a temperature of between 1000° C. and 2000° C., for example between 1250° C. and 1750° C.

Said fumes are conveyed to a heat exchanger, referred to as "secondary heat exchanger" 30. The hot fumes enter the secondary exchanger via a fumes inlet 31 and leave via the fumes outlet 32. Inside the secondary exchanger 30, the fumes heat compressed air by exchange of heat, the compressed air being obtained by compressing ambient air 33 to a pressure of between 10 and 20 atm, for example to around 15 atm, in the compressor 34. The compressor 34 may also supply compressed air to the unit for separating the gases of the air 50. The unit 50 may also have an air compressor (not depicted) specifically dedicated to supplying the unit 50 with air.

The compressed air is introduced into the secondary exchanger 30 via an air inlet 35. The heated air 46 leaves the secondary exchange 30 via the air outlet 36 at a temperature of between 600° C. and 800° C.

According to the invention, the heated air coming from the secondary exchanger 30 is used to generate mechanical and/or electrical energy according to the principle of operation of a gas turbine.

Thus, the heated air 46 is introduced into a combustion chamber 41 by the air intake nozzle. In the combustion chamber 41, the heated air is used to burn (gaseous) fuel introduced by the fuel intake 47. The combustion gases thus obtained are at a temperature of 1000° C. to 1600° C., for example between 1200° C. and 1400° C., and are sent to the inlet 43 of an expansion turbine 42.

In the scenarios illustrated, the energy obtained by this expansion of the combustion gases is transmitted:

on the one hand to the air compressor 34 in the form of mechanical energy by the transmission shaft 45, and on the other hand to the separation unit 50 in the form of electrical energy via the connection 40.

At the outlet or exhaust of the expansion turbine 42, the combustion gases 44 are at a temperature of 550° C. to 750° C. These combustion gases 44 are introduced into a second heat exchanger, referred to as "primary exchanger" 20, via the heat-transfer fluid inlet 21 and leave the primary exchanger 20 via the heat-transfer fluid outlet 22.

Just one primary exchanger 20 is depicted in the figures. However, said primary exchanger 20 may be broken down into a series of several primary subexchangers, namely a series of heat-transfer fluid/combustion oxygen exchangers and/or of heat-transfer fluid/gaseous fuel exchangers.

The stream of oxygen 52 coming from the separation unit 50 is introduced into the primary exchanger 20 via the oxygen inlet 23 and leaves the primary exchanger as preheated oxygen via the oxygen outlet 24. A stream of natural gas 60 is introduced into the primary exchanger 20 via the fuel inlet 25 and leaves the primary exchanger by way of preheated natural gas via the fuel outlet 26. Inside the primary exchanger 20, the stream of oxygen 52 is preheated to a temperature of between 350° C. and 650° C., for example to 550° C., by exchange of heat with the combustion gases and the stream of natural gas 60 is preheated to a temperature of between 250° C. and 550° C., for example to 450° C., likewise by exchange of heat with the combustion gases.

The oxygen thus preheated is transported by way of combustion oxygen to the furnace 10 by the pipe 11 and the natural gas thus preheated is transported by way of fuel to the furnace 10 by the pipe 12.

Figure 2:
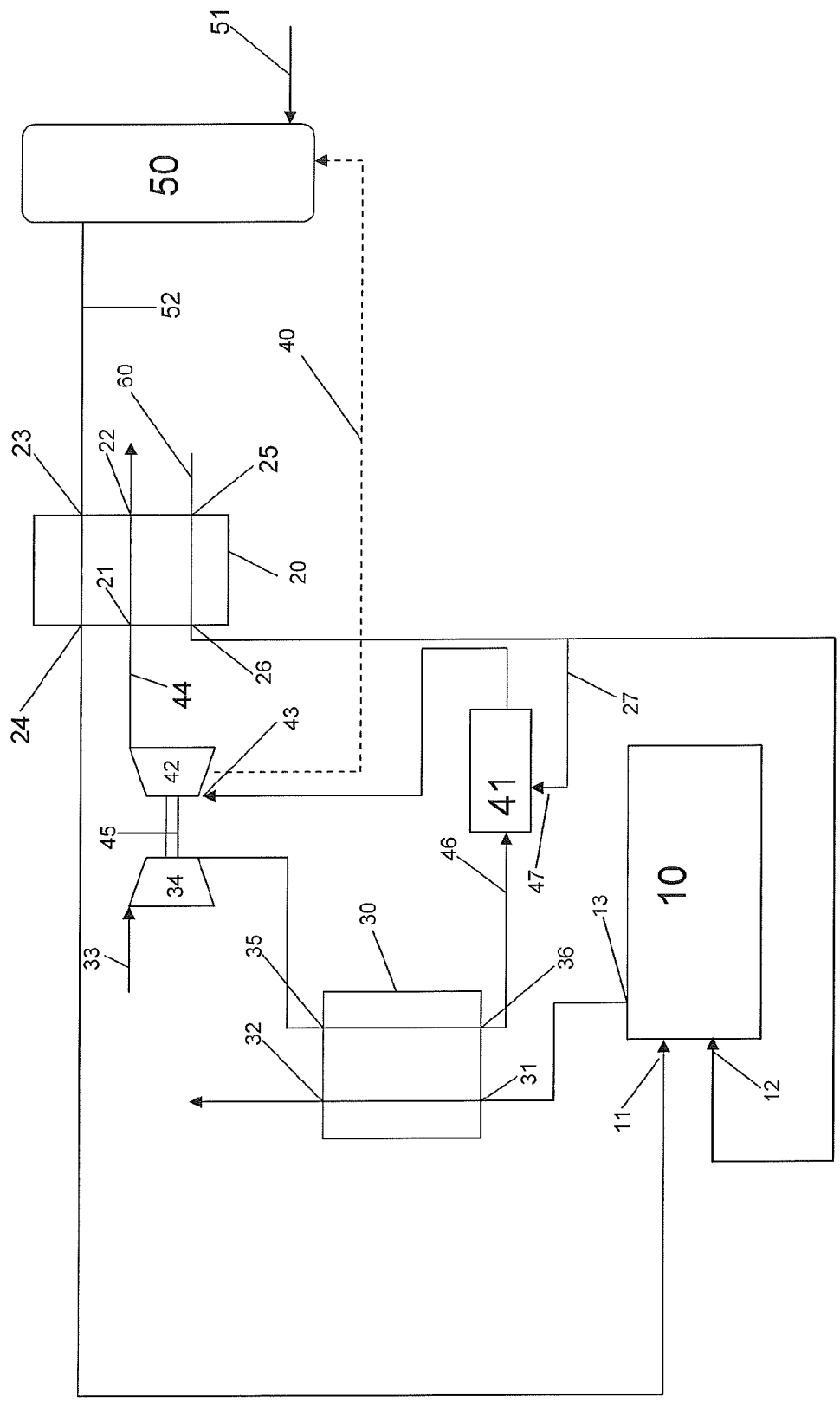

The embodiment illustrated in FIG. 2 differs from that of FIG. 1 in that in FIG. 2 some of the preheated natural gas is used as fuel in the combustion chamber 41.

Example

The present invention and advantages thereof are illustrated in the comparative example below.

The example according to the invention corresponds to the diagram of FIG. 1.

The reference example corresponds to the same diagram except that it has no combustion chamber 41 nor does it have an expansion turbine 42 as described hereinabove, which means to say that it has no gas turbine.

The furnace is a glass melting furnace heated by oxy-combustion only with an oxygen consumption of 7000 $Nm^3/h$ and production of approximately 620 t/d of glass.

The electricity consumption of the unit for separating the gases of the air is estimated at 3 MWe.

In the primary exchanger, the oxygen is preheated to 550° C. and the natural gas is preheated to 450° C.

In the primary exchanger, air compressed to 15 atm is heated to 350° C.

In the example according to the invention, the combustion gases leave the combustion chamber 41 at the temperature of 1300° C.

The electrical balance is defined by taking two consumers into consideration:

The compression stages of the separation unit 50, and

The compression stages of the heat-transfer air.

The following is considered as an energy generating station:

The expansion of the combustion gases in the expansion turbine 42.

The material and energy balances calculated show that the invention is capable of generating all the energy required for the production of the stream of oxygen by the separation unit, or even of releasing excess energy, although a consumption of natural gas is nevertheless involved.

The table summarizes the results of the energy consumptions.

TABLE 1

Energy balances and associated natural gas consumptions

|  | reference | invention |
| --- | --- | --- |
| Electrical balance (kWe) | −2991 | 1384 |
| Additional consumption of natural gas (Nm3/h) | 00.00 | 686.80 |

There are two scenarios that can be envisaged:
a scenario in which the price of electricity is comparable to that of gas (€/MWh),
a scenario in which the price of electricity is at least three times that of gas (€/MWh)

The operating costs include the consumption of electricity and of natural gas.

The investment ratio is calculated on the basis of amortizement over four years with the equipment being available for 8600 hours/year.

Table 2 provides the economic data from these material and energy balances, on the basis of the following prices for natural gas and electricity: natural gas at 40 €/MWh and electricity at 70 €/MWh.

TABLE 2

Investment cost calculation (scenario 1)

|  | reference | invention |
| --- | --- | --- |
| Electrical balance (kWe) | −2991 | 1384 |
| OPEX (EUR/h) | 209.37 | 159.82 |
| Additional investment (EUR/kWh) |  | 390 |

For scenario 2 in which natural gas costs 40 €/MWh and electricity 140 €/MWh, the economic data are set out in table 3:

TABLE 3

Investment cost calculation (scenario 2)

|  | reference | invention |
| --- | --- | --- |
| Electrical balance (kWe) | −2991 | 1384 |
| OPEX (EUR/h) | 418.74 | 62.92 |
| Additional investment (EUR/kWh) |  | 2798 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a" "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for melting in a furnace comprising a melting chamber, the method comprising the steps of:
   preheating at least one combustion reagent chosen from oxygen and gaseous fuel upstream of the melting chamber by exchange of heat with a heat-transfer gas in a primary heat exchanger, thereby obtaining at least one preheated combustion reagent and temperate air;
   heating the melting chamber by means of combustion using at least one preheated combustion reagent, thus generating heat energy and fumes in the melting chamber; and
   removing the fumes from the melting chamber and introduced into a secondary heat exchanger to heat compressed air by exchange of heat with the fumes removed from the melting chamber,
   wherein mechanical and/or electrical energy and a gaseous effluent is generated by means of a gas turbine using the heated compressed air coming from the secondary heat exchanger as oxidant for the gas turbine, and
   the gaseous effluent from the gas turbine is used as heat-transfer gas for preheating the combustion oxygen and/or the gaseous fuel in the primary heat exchanger.

2. The method of claim 1, wherein the mechanical and/or electrical energy generated by the gas turbine is at least partially supplied to one or more air compressors.

3. The method of claim 2, wherein at least some of the mechanical and/or electrical energy generated by the gas turbine is supplied to at least one air compressor chosen from: an air compressor which feeds the secondary heat exchanger, an air compressor which feeds a unit for separating the gases of the air and another air compressor.

4. The method of claim 1, wherein the melting furnace is a glass furnace.

5. The method of claim 1, wherein some of the preheated gaseous fuel coming from the primary heat exchanger is used by way of oxidant for the gas turbine.

6. A melting furnace installation, the melting furnace comprising:
   a furnace defining a melting chamber heated by combustion said melting chamber comprising at least one outlet for fumes generated by combustion,
   a primary heat exchanger for preheating, by exchange of heat between a heat-transfer fluid and either combustion oxygen or gaseous fuel upstream of the melting chamber, said primary exchanger exhibiting (a) an inlet and an outlet for heat-transfer fluid and (b) an inlet and an outlet for combustion oxygen and/or an inlet and an outlet for gaseous fuel,
   a secondary heat exchanger for heating compressed air by exchange of heat with the fumes coming from the melting chamber, said secondary exchanger exhibiting (a) an inlet and an outlet for compressed air and (b) an inlet and an outlet for fumes,
   a first air compressor, said air compressor being connected to the compressed air inlet of the secondary exchanger,
   the installation comprising: connecting the fumes inlet of the secondary exchanger to a fumes outlet of the melting chamber; and
   connecting the combustion oxygen outlet of the primary exchanger to at least one oxidant injector of the melting chamber and/or the gaseous fuel outlet of the primary exchanger is connected to at least one gaseous fuel injector of the melting chamber, wherein
   the installation includes a gas turbine having an air intake nozzle and an exhaust, the compressed air outlet of the secondary exchanger being connected to the air intake nozzle of the gas turbine, the exhaust of the gas turbine being connected to the heat-transfer fluid inlet of the primary exchanger, so as to supply the primary exchanger with exhaust gas from the gas turbine by way of heat-transfer fluid.

7. The use of an installation of claim 6 in a method of claim 1.

8. The installation of claim 6, wherein the gas turbine supplies mechanical and/or electrical energy to at least one air compressor.

9. The installation of claim 8, wherein the gas turbine supplies mechanical energy to at least one air compressor by means of a transmission shaft.

10. The installation of claim 8, wherein the gas turbine supplies mechanical and/or electrical energy to at least one air compressor chosen from: the first air compressor, a second air compressor which feeds a unit for separating the gases of the air and another air compressor.

11. The installation of claim 10, wherein the gas turbine supplies mechanical or electrical energy to a unit for separating the gases of the air exhibiting an oxygen outlet connected to at least one oxidant injector of the melting chamber.

12. The installation of claim 11, wherein the oxygen outlet of the unit for separating the gases of the air is connected to the combustion oxygen inlet of the primary heat exchanger.

13. The installation of claim 6, wherein the combustion oxygen outlet of the primary heat exchanger is connected to at least one oxidant injector incorporated into a burner of the melting chamber and/or the gaseous fuel outlet of the primary heat exchanger is connected to at least one fuel injector incorporated into a burner of the melting chamber.

14. The installation claim 6, wherein the combustion oxygen outlet of the primary heat exchanger is connected to at least one oxidant injector incorporated into an oxidant lance of the melting chamber and/or the gaseous fuel outlet of the primary heat exchanger is connected to at least one fuel injector incorporated into a fuel lance of the melting chamber.

15. The installation of claim 6, wherein the melting furnace is a glass furnace.

\* \* \* \* \*